(12) United States Patent
Lee et al.

(10) Patent No.: US 11,484,843 B2
(45) Date of Patent: Nov. 1, 2022

(54) METHOD OF PREDICTING MEMBRANE FOULING IN REVERSE OSMOSIS PROCESS

(71) Applicant: DOOSAN ENERBILITY CO., LTD., Changwon-si (KR)

(72) Inventors: Young Geun Lee, Gunpo-si (KR); Kwang Hee Shin, Daegu (KR); Sang Ho Lee, Seoul (KR); Yong Jun Choi, Goyang-si (KR)

(*) Notice: Subject to any disclaimer, the term of this patent is extended or adjusted under 35 U.S.C. 154(b) by 237 days.

(21) Appl. No.: 16/712,874

(22) Filed: Dec. 12, 2019

(65) Prior Publication Data

US 2020/0254391 A1    Aug. 13, 2020

(30) Foreign Application Priority Data

Feb. 11, 2019  (KR) .................. 10-2019-0015494

(51) Int. Cl.
*B01D 65/08* (2006.01)
*B01D 61/12* (2006.01)
(Continued)

(52) U.S. Cl.
CPC ............. *B01D 65/08* (2013.01); *B01D 61/12* (2013.01); *B01D 61/58* (2013.01); *B01D 65/02* (2013.01);
(Continued)

(58) Field of Classification Search
CPC .... B01D 61/12; B01D 65/10; B01D 2321/40; B01D 65/02; B01D 61/22; B01D 61/10;
(Continued)

(56) References Cited

U.S. PATENT DOCUMENTS

2011/0035195 A1* 2/2011 Subbiah ................. B01D 61/12
703/2

FOREIGN PATENT DOCUMENTS

JP    2016107235 A    6/2016
KR    101133664 B1    4/2012
(Continued)

OTHER PUBLICATIONS

Barger et al. Desalination,83 (1991)3-33 Elsevier Science PublishersB. V.Amst (Year: 1991).*

*Primary Examiner* — Allison G Fitzsimmons
(74) *Attorney, Agent, or Firm* — Harvest IP Law, LLP

(57) ABSTRACT

A method of predicting membrane fouling in a reverse osmosis process includes collecting information relative to the reverse osmosis process being performed over a predetermined period of time, the collected information including a process factor and a water quality factor, the process factor including a produced water flow rate; calculating a salt removal rate and a pressure drop based on the collected information; normalizing the produced water flow rate, the salt removal rate, and the pressure drop; generating a prediction equation using normalized values of the produced water flow rate, the salt removal rate, and the pressure drop values; and predicting membrane fouling through the generated prediction equation to determine a chemical cleaning time. Process and water quality factors are normalized to temperature and/or flow rate, and the prediction equation uses the normalized factors. Both short-term and long-term predictions are made for chemical cleaning time and membrane module replacement time.

17 Claims, 10 Drawing Sheets

(51) Int. Cl.
  *B01D 61/58* (2006.01)
  *B01D 65/02* (2006.01)
  *G06F 17/11* (2006.01)

(52) U.S. Cl.
  CPC ........ *G06F 17/11* (2013.01); *B01D 2311/263* (2013.01)

(58) Field of Classification Search
  CPC .... B01D 65/08; B01D 61/58; B01D 2311/16; B01D 2311/263; B01D 61/025; B01D 2311/24; B01D 2311/246; B01D 2321/16; B01D 61/145; B01D 63/10; B01D 2311/04; B01D 2311/10; B01D 2311/14; B01D 2315/10; B01D 2315/20; B01D 2321/04; B01D 61/022; B01D 61/027; B01D 61/142; C02F 1/444; C02F 1/68; C02F 2103/08; C02F 2209/003; C02F 2209/05; C02F 1/00; C02F 1/0018; C02F 1/44; C02F 1/441; C02F 2209/10; C02F 2303/16; C02F 1/442; C02F 1/685; C02F 1/687; C02F 2209/001; C02F 2209/03; C02F 2209/055; C02F 2209/06; C02F 2209/07; C02F 2209/11; C02F 2209/24; C02F 2209/40; C02F 1/66; C02F 2001/007; C02F 2103/001; C02F 2103/02; C02F 2103/42; C02F 2103/06; C02F 2209/005; C02F 2301/043; C02F 2301/046; C02F 2303/20; C02F 2303/24; C02F 2209/008; C02F 2209/02; C02F 2303/08; C02F 2303/14; C02F 2303/22; C02F 5/00; C02F 5/06; C02F 9/00; Y02A 20/131; G01N 17/008; G01N 29/041; G01N 29/4436; G01N 33/18; G01N 5/02; G01N 21/553; G01N 21/64; G01N 21/94; G01N 2291/0426; G01N 29/022; G01N 29/032; G01N 29/036; A23L 2/52; A23L 2/54; A23L 2/74; G06F 17/11; G06F 17/16; B01F 15/04; B01F 3/04; B01F 5/0602; B01F 7/00; C01B 5/00; C01F 11/18

See application file for complete search history.

(56) References Cited

FOREIGN PATENT DOCUMENTS

| | | |
|---|---|---|
| KR | 101144316 B1 | 5/2012 |
| KR | 20140054670 A | 5/2014 |
| KR | 101542617 B1 | 8/2015 |
| KR | 20160057595 A | 5/2016 |
| KR | 20160130006 A | 11/2016 |
| KR | 101872109 B1 | 6/2018 |

* cited by examiner

METHOD OF PREDICTING MEMBRANE FOULING IN REVERSE OSMOSIS PROCESS

CROSS REFERENCE TO RELATED APPLICATION

The present application claims priority to Korean Patent Application No. 10-2019-0015494, filed Feb. 11, 2019, the entire contents of which are incorporated herein for all purposes by this reference.

BACKGROUND OF THE DISCLOSURE

Field of the Disclosure

The present disclosure relates generally to a method of predicting membrane fouling in a reverse osmosis process. More particularly, the present disclosure relates to a method whereby process and water quality factors measured in a water treatment process using a reverse osmosis membrane are normalized with respect to temperature and flow rate, a prediction equation is established using the normalized factors, and short-term and long-term prediction of membrane fouling is performed using the prediction equation, so that a chemical cleaning time and a membrane module replacement time may be accurately predicted.

Discussion of the Related Art

Membrane filtration technology includes a process enabling separation and removal of a target material in raw water, sewage, or wastewater. The completeness of the separation and removal depends on the pore size and surface charge of a membrane. Such a membrane is a porous body with a multitude of pores to separate (filter out) organic pollutants, inorganic pollutants, parasites, bacteria, and the like, which may be present in the water. Membrane filtration technology is an effective technique for water treatment in terms of removal efficiency of organic/inorganic pollutants, organic substances in effluents of waste water, and other pollutants.

Water treatment using a membrane is popular in the water treatment industry, which prefers using less chemicals such as a coagulant and requiring less land area (smaller footprint), and therefore a membrane separation process enjoys advantages over other filtration processes. Critical factors in a membrane separation process include the quantity and quality of water that can be produced using one membrane, that is, without membrane replacement. Membrane fouling is nevertheless inevitable, leading to reduced performance of the membrane during the membrane separation process.

Membrane fouling is a phenomenon that occurs when various contaminants in feed water become deposited on or adsorbed in the surface of a membrane and thus reduce its water permeability. There are various kinds of contaminants that cause membrane fouling. These include suspended particles, colloids, organic components, microorganisms, and mineral salts such as a calcium salt.

Membrane fouling is affected by electrostatic interaction (repulsion or attraction) or hydrophobic interaction, depending on hydraulic factors such as size of contaminants, properties of a membrane, and chemical properties of contaminants. These interactions also affect diffusion coefficient of contaminants from a membrane surface. This results in a reduction in the overall operability of a facility and an increase in its operating cost.

Therefore, accurately predicting membrane contamination is crucial in terms of water treatment efficiency and cost. However, predicting the membrane fouling phenomenon is hindered because fouling may be caused by any one of several substances, as described above.

Currently, studies on the membrane fouling phenomenon remain in membrane fouling evaluation by existing membrane fouling indexes, such as filtration experimentation, analysis of membranes with contamination, and a silt density index. The silt density index is used as a measure for membrane fouling potential. The degree of fouling caused by suspended solids can be estimated by measuring the time for water to pass through a filter having a predetermined standard under a predetermined pressure.

Silt density index measurement is the most widely used indirect membrane fouling evaluation method currently used to predict the membrane fouling potential in reverse osmosis or nanofiltration processes. However, since the filters employed have a pore diameter of 0.45 μm, influence due to colloid or organic components having a size of less than 0.45 μm cannot be evaluated.

Furthermore, total organic carbon (TOC) is commonly used as a method for analyzing membrane fouling due to organic components. However, TOC values include various organic components, even those that have low correlation with membrane fouling, and their overall low correlation with organic membrane fouling makes it difficult to accurately predict membrane fouling. In addition, measurement of TOC requires costly instrumentation and specialists, making it unsuitable for use as an indicator in field plants.

SUMMARY OF THE DISCLOSURE

Accordingly, the present disclosure has been made keeping in mind the above problems occurring in the related art, and an objective of the present disclosure is to provide a method of predicting membrane fouling in a reverse osmosis process, whereby process and water quality factors measured in a water treatment process using a reverse osmosis membrane are normalized with respect to temperature and flow rate, and a prediction equation is established using the normalized factors.

Another objective of the present disclosure is to provide a method of predicting membrane fouling in a reverse osmosis process in which both short-term and long-term predictions of membrane fouling can be performed using the prediction equation.

Another objective of the present disclosure is to provide a method of predicting membrane fouling in a reverse osmosis process, which results in an accurate prediction of a chemical cleaning time and a membrane module replacement time.

In addition to the above-objective of the present disclosure, other objectives and advantages will be apparent from the detailed description and embodiments of the disclosure which will be described later.

In order to achieve the above objective, according to one aspect of the present disclosure, there is provided a method of predicting membrane fouling in a reverse osmosis process. The method may include collecting information relative to the reverse osmosis process being performed over a predetermined period of time, the collected information including a process factor and a water quality factor, the process factor including a produced water flow rate; calculating a salt removal rate and a pressure drop based on the collected information; normalizing the produced water flow rate, the salt removal rate, and the pressure drop; generating a prediction equation using normalized values of the produced water flow rate, the salt removal rate, and the pressure drop values; and predicting membrane fouling through the generated prediction equation to determine a chemical cleaning time. The produced water flow rate, the salt removal rate, and the pressure drop may be normalized for at least one of a temperature and a flow rate.

The prediction equation may be generated as a linear expression and a power expression for each of the normalized pressure drop, a normalized water permeability calculated using the normalized produced water flow rate, and a normalized water permeability using the normalized salt removal rate, wherein the linear expression includes $Y(t)=at+b$, and the power expression incudes $Y(t)=at^b$. Here, $Y(t)$ may be a predicted value of each of the normalized pressure drop, the normalized water permeability, and the normalized salt permeability; t may be an operating time; and a and b may be fitting parameters. The prediction equation generating includes selecting, among the prediction equations, the prediction equation having a higher correlation with respect to a measured value.

The method may further include regenerating a prediction equation corresponding to the prediction equation generated by the prediction equation generating, when an error between an average value of the predicted values $Y(t)$ and an average value of measured values over a predetermined period is outside a predetermined range.

The chemical cleaning time may be determined as a time at which at least one of the predicted values of the normalized water permeability, the normalized salt permeability, and the normalized pressure drop predicted through the prediction equations fulfills a reference value, and the reference value may be predetermined for each of the normalized water permeability, the normalized salt permeability, and the normalized pressure drop.

The method may further include transmitting a preparation signal for performing chemical cleaning, when the at least one of the predicted values of the normalized water permeability, the normalized salt permeability, and the normalized pressure drop predicted through the prediction equations is not less than a predetermined ratio of the reference value.

According to another aspect of the present disclosure, there is provided a method of predicting membrane fouling in a reverse osmosis process. The method may include collecting information relative to the reverse osmosis process being performed over a predetermined period of time, the collected information including a process factor and a water quality factor, the process factor including a produced water flow rate; calculating a salt removal rate and a pressure drop based on the collected information; normalizing the produced water flow rate, the salt removal rate, and the pressure drop; generating a prediction equation using normalized values of the produced water flow rate, the salt removal rate, and the pressure drop values; and predicting membrane fouling by using the prediction equation in order to determine a chemical cleaning time and a membrane replacement time, when a correlation between a predicted value predicted through the prediction equation and a measured value is not less than a predetermined value. The produced water flow rate, the salt removal rate, and the pressure drop may be normalized for at least one of a temperature and a flow rate.

The prediction equation may include a first equation indicating a variation of a normalized factor during a chemical cleaning cycle, and a second equation indicating a value of the normalized factor immediately after performing chemical cleaning, and the normalized factor may include the pressure drop, a water permeability, and a salt permeability.

The first equation may be generated as a linear expression and a power expression using a monthly average variation of each of the normalized pressure drop, the normalized water permeability, and the normalized salt permeability during the chemical cleaning cycle, wherein the linear expression includes $Y''(t)=at+b$, the power expression includes $Y'(t)=at^b$. Here, $Y'(t)$ may be a predicted value of a variation of each of the normalized pressure drop, the normalized water permeability, and the normalized salt permeability during the chemical cleaning cycle; t may be an operating time; and a and b may be fitting parameters. The prediction equation generating includes selecting, among the prediction equations, the prediction equation having a higher correlation with respect to a measured value.

The membrane fouling may be predicted by directly applying the monthly average variations instead of the first equation, when the correlation of the first equation is less than the predetermined value.

The second equation is generated as a linear expression and a power expression using a value of each of the normalized pressure drop, the normalized water permeability, and the normalized salt permeability immediately after performing the chemical cleaning, wherein the linear expression includes $Y''(t)=at+b$, the power expression includes $Y''(t)=at^b$. Here, $Y''(t)$ may be a predicted value of each of the normalized pressure drop, the normalized water permeability, and the normalized salt permeability immediately after performing chemical cleaning; t may be an operating time; and a and b may be fitting parameters. The prediction equation generating includes selecting, among the prediction equations, the prediction equation having a higher correlation with respect to a measured value.

The membrane fouling may be predicted by using an average value of the normalized pressure drop, or the normalized salt or water permeability, immediately after performing the chemical cleaning, when the correlation of the second equation for the normalized pressure drop/normalized salt or water permeability is less than the predetermined value immediately after performing the chemical cleaning. Alternatively, the membrane fouling may be predicted by applying the normalized water permeability immediately after performing a monthly chemical cleaning or by applying an average value of the normalized water permeability immediately before and after a corresponding month, when the correlation of the second equation for the normalized salt permeability is less than the predetermined value immediately after performing the chemical cleaning.

The chemical cleaning may be performed multiple times, each chemical cleaning time determined as a time at which at least one of the predicted values of the normalized water permeability, the normalized salt permeability, and the normalized pressure drop may be predicted through the prediction equation fulfills a reference value. Here, the reference value may be predetermined for each of the normalized water permeability, the normalized salt permeability, and the normalized pressure drop.

The membrane replacement time may be determined as a time at which a predicted value of the normalized salt permeability prediction value is not less than the predetermined value.

The normalized water permeability may be calculated by $$A_n = \frac{Q_n}{M \times RNDP}$$

wherein $A_n$ is the normalized water permeability expressed in $m^3/(m^2\text{-hr-bar})$; $Q_n$ is the normalized produced water flow rate expressed in $m^3/hr$; M is a membrane area expressed in $m^2$; and RNDP is a reference net driving force expressed in bars.

The normalized salt permeability may be calculated by $$B_n = S_n \times (1 - S_n) \times \frac{Q_n}{M}$$

wherein $B_n$ is the normalized salt permeability expressed in m/hr; $S_n$ is the salt removal rate; $Q_n$ is the normalized produced water flow rate expressed in $m^3/hr$; and M is a membrane area expressed in $m^2$.

In the method of predicting membrane fouling in a reverse osmosis process according to the present disclosure, prediction of membrane fouling is made based on operation information of medium-scale and large-scale reverse osmosis plants, enabling accurate prediction of the degree of membrane fouling in medium and large-scale reverse osmosis plants.

In addition, by utilizing information that is obtained by normalizing process and water quality factors in order to predict the membrane fouling for a given temperature and flow rate, prediction accuracy depending on seasonal or environmental changes can be further improved.

Moreover, while a membrane fouling prediction method in the related art that predicts only chemical cleaning time, the method of predicting membrane fouling in the reverse osmosis process of the present disclosure enables prediction of replacement time of a membrane module as well as chemical cleaning time, thus making it possible that a more efficient operation of reverse osmosis plants is achieved.

However, the effects of the present disclosure are not limited to the above-mentioned effects, and other effects not mentioned will be clearly understood by those skilled in the art from the following description.

DETAILED DESCRIPTION OF DISCLOSURE

Figure 1:
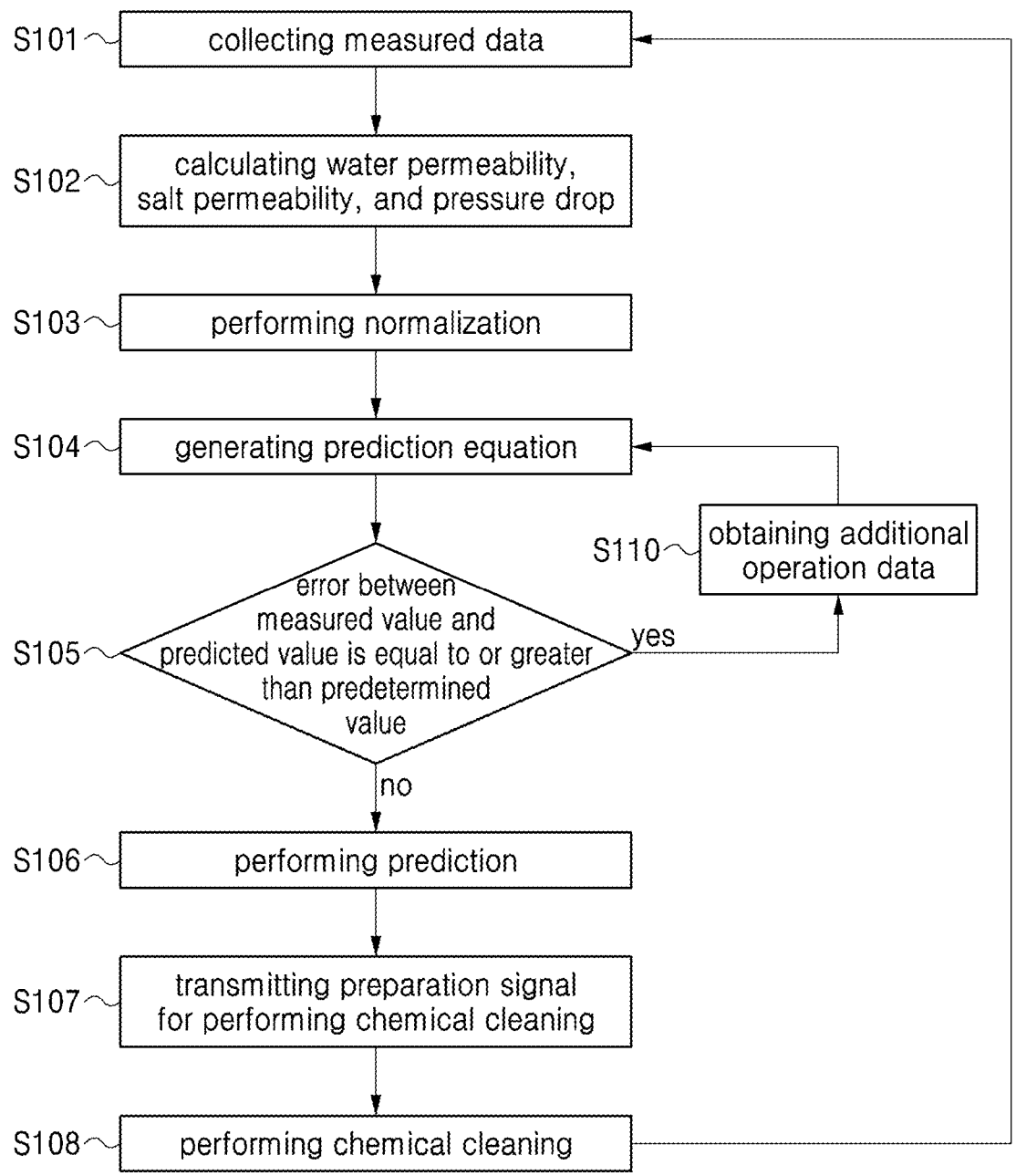
FIG. 1 is a flowchart of a method of predicting membrane fouling in a reverse osmosis process according to a first embodiment of the present disclosure.

Reference will now be made in greater detail to exemplary embodiments of the present disclosure. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all technical and scientific terms used herein have the same meanings as commonly understood by one of ordinary skill in the art to which this disclosure belongs. In case of conflict, the present specification, including definitions, will control.

Hereinafter, the present disclosure will be described in detail with reference to embodiments and the accompanying drawings. These embodiments are only examples of the disclosure, and it will be apparent to those of ordinary skill in the art that the scope of the present disclosure is not limited by these embodiments.

The present disclosure relates to a method of predicting membrane fouling in medium-scale and large-scale reverse osmosis processes.

In a reverse osmosis process, which is a desalination process, a membrane is interposed between two solutions of different concentrations, and a pressure is applied to the higher concentration solution to force a solvent therein to migrate through the membrane to the low-concentration solution. When feed water is supplied to a reverse osmosis module in which the reverse osmosis process is performed, desalinated produced water, treated water, or permeate is discharged and used as drinking water, industrial water, agricultural water, and the like, and high solute concentration water is recycled or discharged.

Meanwhile, the above reverse osmosis process may be performed in medium to large scale reverse osmosis plants, which exhibit particular operational characteristics compared to smaller plants. The time consuming nature of known techniques for membrane fouling evaluation and the limitations of a laboratory environment for membrane fouling evaluation both serve to impede the accurate evaluation of the degree of membrane fouling occurring in medium to large scale reverse osmosis plants. Therefore, there is a need for a method for predicting membrane fouling that can accurately predict the degree of membrane fouling occurring in medium to large scale reverse osmosis plants.

There is a further need for a method for predicting membrane fouling that can predict a replacement time of a membrane module. In addition, there is a further need for a method for predicting a chemical cleaning time depending on the degree of membrane fouling.

Accordingly, the method of predicting membrane fouling of the present disclosure can calculate the degree of fouling of a membrane used in the reverse osmosis process based on actual operating information, thus accurately predicting the time of chemical cleaning and membrane replacement to maintain a stable performance of the membrane.

In addition, the amount of chemicals used for chemical cleaning and the operating pressure for producing the design flow rate can be predicted, thus making it possible that operating costs of reverse osmosis plants using reverse osmosis processes are predicted, and that the quality of produced water is predicted.

The method of predicting membrane fouling in the reverse osmosis process according to the present disclosure may be divided into short-term prediction and long-term prediction. A short-term prediction method of membrane fouling can predict an accurate time of chemical cleaning in short-term operations, such as seven days or less, while a long-term prediction method of membrane fouling can predict the time of chemical cleaning and membrane replacement in long-term operations, such as one month or more.

FIG. 1 shows a short-term prediction method for predicting membrane fouling in a reverse osmosis process according to a first embodiment of the present disclosure. Such a method may include the exploitation of an algorithm.

The short-term prediction method according to the first embodiment may include a collection step S101, a calculation step S102, a normalization step S103, a prediction equation generation step S104, and a prediction step S106. The method may further include an error threshold detection step S105, a data obtaining step S110, a preparation signal transmission step S107, and a chemical cleaning step S108.

In more detail, the short-term prediction method includes collecting information relative to the reverse osmosis process being performed over a predetermined (e.g., short) period of time, the collected information including a process factor and a water quality factor, where the process factor may include a produced water flow rate (S101); calculating a salt removal rate and a pressure drop based on the collected information (S102); normalizing the produced water flow rate, the calculated salt removal rate, and the calculated pressure drop (S103); generating a prediction equation using normalized values of the produced water flow rate, the salt removal rate, and the pressure drop values (S104); and predicting membrane fouling through the generated prediction equation to determine a chemical cleaning time (S106).

In the step S104, a prediction equation is individually generated for each factor, namely, the normalized pressure drop, the normalized water permeability, and the normalized salt permeability. The prediction equation is obtained using a linear expression (Equation 1) and a power expression (Equation 2). Among these, the expression having a higher correlation $R^2$ with respect to a measured value may be selected as the prediction equation for a given factor.

$$Y(t)=at+b \qquad \text{Equation 1}$$

$$Y(t)=at^b \qquad \text{Equation 2}$$

In Equations 1 and 2, Y(t) is a predicted value of each of the normalized pressure drop, the normalized water permeability, and the normalized salt permeability; t is an operating time, preferably indicated in units of days; and a and b are fitting parameters.

In other words, by representing a predicted value (Y) for each factor over the predetermined period of time per Equations 1 and 2, and by determining the fitting parameters (a, b) so as to maximize the correlation $R^2$ between the measured value and the predicted value, Equations 1 and 2 can output predicted values similar to measured values. This ensures increased prediction accuracy of membrane fouling.

In the step S101, measured data (information) is collected. The collected information is indicative of the process and water quality factors obtained by performing the reverse osmosis process over the predetermined period of time. In the short-term prediction method of FIG. 1, the predetermined period of time refers to a relatively short period of time and may be set by a user. Herein, a short period of time may be preferably any period among one to seven days, one to five days, and one to three days, but is not limited to any of these periods.

The process factor collected in the collection step (S101) may include one or more of the flow rate, pressure, separation area of each of feed water, concentrated water, and produced water. The water quality factor may include one or more of the temperature of feed water, the temperature of concentrated water, the temperature of produced water, and the total dissolved solids (TDS) of a reverse osmosis module in which the reverse osmosis process is performed. However, the present disclosure is not limited to any of these factors, and additional process or water quality factors may be collected in addition to the above factors as required.

In the step S102, the salt removal rate and the pressure drop are calculated according to Equations 3 and 4 based on the information collected in the collection step S101.

The salt removal rate can be calculated by Equation 3.

$$S_n = \frac{TDS_p}{TDD_{avg,f-c}} \times 100 \qquad \text{Equation 3}$$

In Equation 3, $S_n$ denotes salt removal rate expressed as a percentage; $TDS_p$ denotes total dissolved solids (TDS) concentration in produced water; and $TDS_{avg,f-c}$ denotes average TDS concentration in feed water and concentrated water The pressure drop can be calculated by Equation 4.

$$\Delta P = P_f P_c \qquad \text{Equation 4}$$

In Equation 4, $\Delta P$ denotes a pressure drop expressed in bar; $P_f$ denotes pressure of feed water; and $P_c$ denotes pressure of concentrated water.

When calculating the salt removal rate using Equation 3, the average total TDS concentration ($TDS_{avg,f-c}$) contained in feed water and concentrated water is used. Here, the average may be an arithmetic mean, a geometric mean, or a harmonic mean.

In the step S103, the produced water flow rate collected in the collection step (S101) and the salt removal rate and the pressure drop calculated in the calculation step (S102) are normalized. Here, normalization is performed for a temperature and/or a flow rate.

For example, normalization of the produced water flow rate can be calculated by Equation 5, and normalization of other factors can be performed in the same or similar manner.

$$Q_n = Q \times \frac{RNDP}{NDP} \times \frac{RTCF}{TCF} \qquad \text{Equation 5}$$

In Equation 5, $Q_n$ denotes normalized produced water flow rate expressed in m³/hr; Q denotes produced water flow rate expressed in m³/hr; RNDP denotes a reference net driving force; NDP denotes a net driving force; RTCF denotes a reference temperature correction factor; and TCF denotes a temperature correction factor.

The RNDP values and the RTCF value are values set according to a calculation based on user input values, that is, values defined by a user's input, and are thus constants that do not change over time. Meanwhile, the NDP value and the TCF value are measured values calculated during the operation of the reverse osmosis process or calculated using the measured values. As such, the NDP and TCF values change over time, that is, a period during which the reverse osmosis process is operated.

Although the RNDP value and the NDP value are represented by the same type of equation, information used for their calculation is different. The RTCF value and the TCF value have the same relationship as that between the RNDP and NDP values.

The RNDP value and the NDP value refer to the feed pressures of feed water excluding the pressure drop and osmotic pressure of a line flowing from feed water to concentrated water and the pressure drop and osmotic pressure of a line flowing from feed water to concentrated water, i.e., pure driving pressures excluding various pressure drops. A predetermined weight may be applied to the pressure drop in the line flowing from feed water to concentrated water, and the predetermined weight may be 0.5.

The RTCF value and the TCF value are temperature correction values applied to remove the influence due to temperature changes caused by external environmental changes such as air temperature. The RTCF and TCF values can be calculated through Equation 6.

$$RTCF \text{ or } TCF = \exp\left[1965 \times \left(\frac{1}{298} - \frac{1}{T+273}\right)\right] \times \exp[\alpha \times (T-25)] \quad \text{Equation 6}$$

In Equation 6, T denotes water temperature expressed in °C.; and $\alpha$ equals 0.0148 (if T≤25) or 0.0046 (if T>25).

The foregoing disclosure has described a method of normalizing the produced water flow rate. When normalizing factors other than the produced water flow rate, at least part of the factors applied to Equation 5 or 6 may be applied. In addition, factors of flow rate values and total dissolved solids concentration may be applied.

In other words, normalization is a method whereby the correlation between set values and measured values measured during the operation of the reverse osmosis process is applied to the produced water flow rate, the salt removal rate, and the pressure drop. Therefore, it is ensured that even when the temperature, flow rate, and the like of feed water, concentrated water, and produced water of the reverse osmosis module are changed due to various external and environmental factors such as climate and season, prediction of the degree of membrane fouling is enabled by excluding influences due to these factors.

Thus, the prediction equation generation step S104 generates a prediction equation using the normalized produced water flow rate, the normalized salt removal rate, and the normalized pressure drop values obtained by the above method. That is, using Equations 1 and 2 as described above, the step S104 generates prediction equations for the normalized pressure drop; a normalized water permeability calculated using the normalized produced water flow rate; and a normalized salt permeability using the normalized salt removal rate.

Instead of using the normalized produced water flow rate and the normalized salt removal rate, prediction equations may be generated using the normalized water permeability and the normalized salt permeability, which are values respectively calculated using the former. The normalized water permeability is calculated by Equation 7, and the normalized salt permeability calculated by Equation 8.

$$A_n = \frac{Q_n}{M \times RNDP} \quad \text{Equation 7}$$

In Equation 7, $A_n$ denotes normalized water permeability expressed in m³/(m²-hr-bar); $Q_n$ denotes normalized produced water flow rate expressed in m³/hr; M denotes membrane area expressed in m²; and RNDP denotes reference net driving force expressed in bars.

$$B_n = S_n \times (1 - S_n) \times \frac{Q_n}{M} \quad \text{Equation 8}$$

In Equation 8, $B_n$ denotes normalized salt permeability expressed in m/hr; $S_n$ denotes salt removal rate; $Q_n$ denotes normalized produced water flow rate expressed in m³/hr; and M denotes membrane area expressed in m².

Therefore, when using the normalized water permeability instead of the normalized produced water flow rate, prediction of membrane fouling based on the reference net driving force and the membrane area is enabled, thus deriving a more accurate prediction equation. When using the normalized salt permeability, the salt removal rate within the flow rate of produced water through the membrane area is taken into account, thus deriving a more accurate prediction equation than when using the normalized salt removal rate.

Thereafter, the prediction step S106 is performed to predict membrane fouling through the generated prediction equations in order to determine the chemical cleaning time. In doing so, it is determined the time at which predicted values of the normalized water permeability, the normalized salt permeability, and/or the normalized pressure drop fulfills (satisfies) a reference value as the chemical cleaning time. The reference value applied herein may be a specific value or variable, and the reference value is set differently for each predicted value.

In other words, the time at which the predicted value of the normalized water permeability fulfills a reference value of the normalized water permeability, the time at which the predicted value of the normalized salt permeability fulfills a reference value of the normalized salt permeability, the time at which the predicted value of the normalized pressure drop fulfills a reference value of the normalized pressure drop, or the time at which at least two of these conditions are established may be determined as the chemical cleaning time.

On the other hand, in order to improve the accuracy of the prediction equations, a further step may be included between the steps S104 and S106. That is, when the error between the predicted values of the factors predicted through the prediction equations and measured values is outside a predetermined range, the data obtaining step S110 may be performed to obtain additional reverse osmosis process operation information in order to regenerate a corresponding prediction equation corresponding to the obtained information.

Here, factors used when considering the error between the predicted values and the measured values may be the normalized water permeability, the normalized salt permeability, and the normalized pressure drop. However, the normalized produced water flow rate may be used instead of the normalized water permeability, or the normalized salt removal rate may be used instead of the normalized salt permeability.

The prediction equation regeneration regenerates only a prediction equation of a corresponding factor in which the error between a predicted value and a measured value of each factor is outside a predetermined range, and a factor in which the error is not outside the predetermined range continues to use an initial prediction equation.

For example, when the error between predicted values and measured values of the normalized water permeability and the normalized salt permeability is inside (within) a predetermined range, and the error between a predicted value and a measured value of the normalized pressure drop is outside the predetermined range, measured operation information is obtained until a corresponding time is reached, and a predicted equation of the normalized pressure drop is regenerated in the same manner as in the prediction equation generation step (S104). The prediction equation of each of the normalized water permeability and the normalized salt permeability is used until the time at which the error between the measured value and the predicted value is outside the predetermined range, or until the time at which chemical cleaning is determined.

The error may be an error at a specific time, or may be an error between an average value of predicted values predicted during a predetermined period of time and an average value of measured values measured during the same period of time. As just one example, the error may be an error between an average value of measured values measured for three days and an average value of predicted values calculated for three days calculated using a prediction equation. Here, instead of the three-day period of the example, information measured or calculated over a predetermined period of time defined by a user may be used.

The tolerance of the error, i.e., the tolerance of the error that does not need to regenerate a prediction equation, may also be user defined, for example, 3%, 5%, 8%, or 10%. The error tolerance may be appropriately selected depending on operating environment, process conditions, and the like.

As described above, the time at which a predicted value measured using a generated prediction equation or a regenerated prediction equation fulfills a reference value is determined as the chemical cleaning time. Here, when the predicted value is greater than or equal to (not less than) a predetermined ratio of the reference value, the preparation signal transmission step S107 may be further performed to transmit a preparation signal for performing chemical cleaning (S108).

For example, the predetermined ratio may be 90%. In this case, when the predicted value is greater than or equal to 90% of the reference value, the preparation signal for performing chemical cleaning may be transmitted. However, this is merely an example, and the predetermined ratio may be set by a user.

Thereafter, when the predicted value reaches the reference value, chemical cleaning is performed. After chemical cleaning, membrane fouling prediction according to the first embodiment of the present disclosure may be performed by returning to the collection step (S101).

Figure 2:
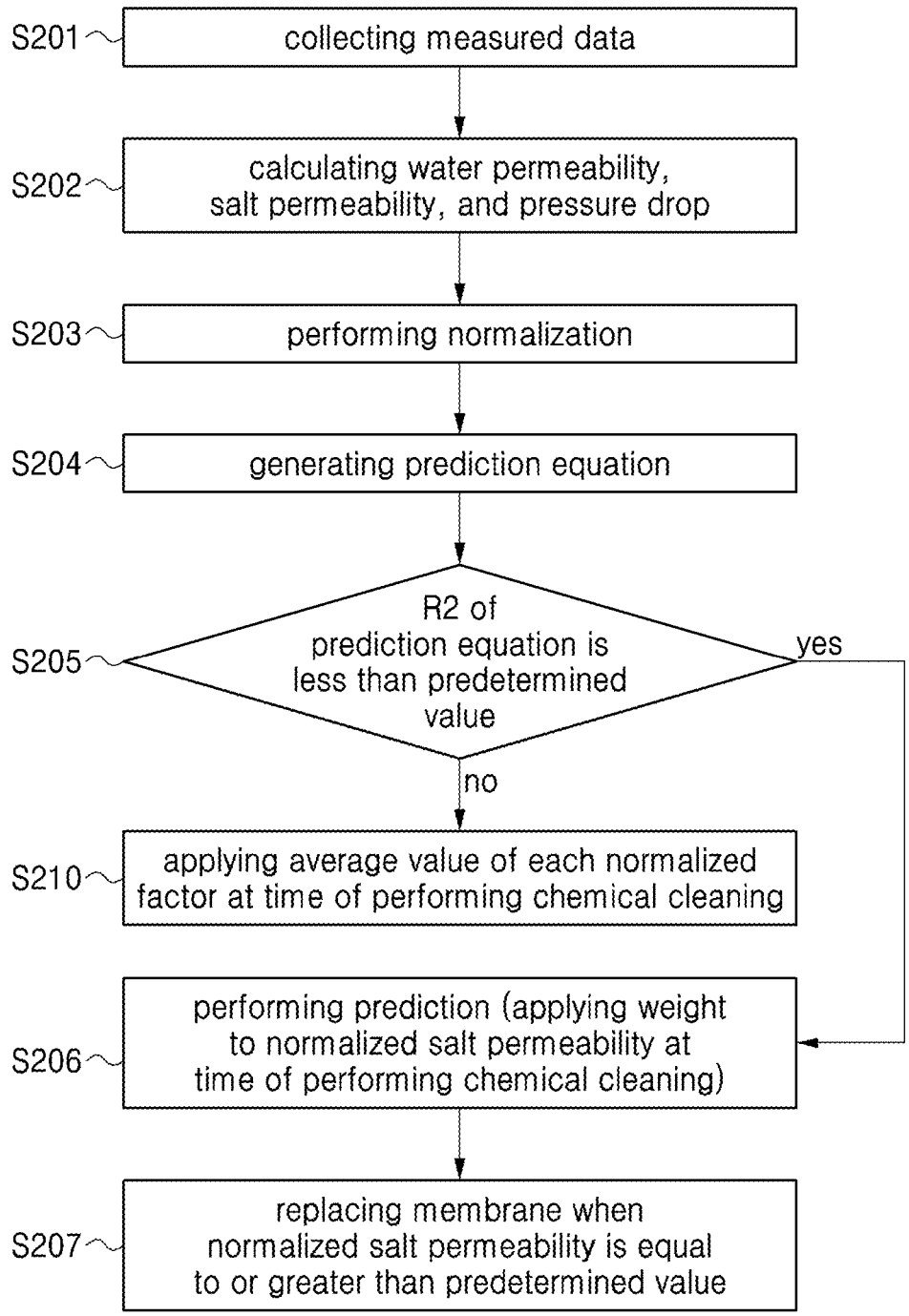
FIG. 2 is a flowchart of a method of predicting membrane fouling in a reverse osmosis process according to a second embodiment of the present disclosure.

Meanwhile, FIG. 2 shows a long-term prediction method for predicting membrane fouling in a reverse osmosis process according to a second embodiment of the present disclosure. Such a method may include the exploitation of an algorithm.

A long-term prediction method of the present disclosure is a method of collecting reverse osmosis process operation information over a long-term of, say, one year. The method generates a prediction equation for predicting membrane fouling over a long period of time using the collected information, and determines the time of performing chemical cleaning and the time of replacing a membrane module through the generated prediction equation.

The long-term prediction method according to the second embodiment may include a collection step S201, a calculation step S202, a normalization step S203, a prediction equation generation step S204, and a prediction step S206. The method may further include a correlation step S205, a membrane replacement step S207, and a value averaging step S210.

In more detail, the long-term prediction method includes collecting information relative to the reverse osmosis process being performed over a predetermined (e.g., long) period of time, the collected information including a process factor and a water quality factor, where the process factor may include a produced water flow rate (S201); calculating a salt removal rate and a pressure drop based on the collected information (S202); normalizing the produced water flow rate, the calculated salt removal rate, and the calculated pressure drop (S203); generating a prediction equation using normalized values of the produced water flow rate, the salt removal rate, and the pressure drop values (S204); and predicting membrane fouling through the generated prediction equation to determine a chemical cleaning time and a membrane replacement time (S206).

In the step S201, measured data (information) is collected. The collected information is indicative of the process and water quality factors obtained by performing the reverse osmosis process over the predetermined period of time. In the long-term prediction method of FIG. 2, the predetermined period of time refers to a relatively long period of time and may be set by a user. Herein, a long period of time may be a period of one month to one year and is preferably a period of three months to one year, but is not limited to any of these periods.

The water quality factor and the process factor collected in the collection step (S201) are the same as those collected in the short-term prediction method of the first embodiment described above.

In the step S202, the salt removal rate and the pressure drop are calculated based on the information collected in the collection step S201. Here, the salt removal rate and the pressure drop may be calculated using the same calculation method used in the short-term prediction method of the first embodiment, that is, according to Equations 3 and 4.

In the step S203, the produced water flow rate collected in the collection step (S101) and the salt removal rate and the pressure drop calculated in the calculation step (S102) are normalized. Here, normalization is performed for a temperature and/or a flow rate. As in the case of steps S201 and S202, step S203 may be performed using the same normalization described in the short-term prediction method the first embodiment, that is, according to Equations 5-8, and thus duplicate description will be omitted.

In the step S204, a prediction equation is generated for each factor, using the normalized pressure drop, a normalized water permeability calculated using the normalized produced water flow rate, and a normalized salt permeability using the normalized salt removal rate.

As described above, since the present embodiment relates to long-term prediction of membrane fouling, chemical cleaning is performed at least once. When chemical cleaning is performed, the normalized pressure drop, the normalized water permeability, and the normalized salt permeability have relatively good values based on the chemical cleaning time. Due to this, in this embodiment, it is preferable that a prediction equation for each chemical cleaning cycle is generated. It is more preferable that, in addition to generating a prediction equation for each chemical cleaning cycle, the prediction equation is established in consideration of a predetermined period of time based on, for example, monthly or seasonal information.

A detailed method of generating a prediction equation as above will be described below.

The prediction equation includes first and second prediction equations. The first prediction equation indicates the variation of a normalized factor during a chemical cleaning cycle, and the second prediction equation indicates a value of the normalized factor immediately after chemical cleaning time.

Each prediction equation is generated individually for each factor. In other words, a first prediction equation and a second prediction equation for the normalized pressure drop, a first prediction equation and a second prediction equation for the normalized water permeability, and a first prediction equation and a second prediction equation for the normalized salt permeability are generated individually. Therefore, it is apparent that various calculations and parameters used for predicting membrane fouling below are all calculated and derived individually for each specific prediction equation for a specific factor.

In generating each prediction equation, the prediction equation for each factor is obtained using a linear expression (Equation 9) and a power expression (Equation 10). Among these, the expression having a higher correlation $R^2$ with respect to a measured value may be selected as the prediction equation for a given factor.

$$Y'(t)=at+b \qquad \text{Equation 9}$$

$$Y'(t)=at^b \qquad \text{Equation 10}$$

In Equations 9 and 10, Y'(t) is a predicted value of a variation of each of the normalized pressure drop, the normalized water permeability, and the normalized salt permeability during a chemical cleaning cycle, and a predicted value of each of the normalized pressure drop, the normalized water permeability, and the normalized salt permeability immediately after chemical cleaning; t is an operating time preferably indicated in units of months; and a and b are fitting parameters.

The first prediction equation represented by Equation 1 or Equation 2 is obtained by using an average variation of each factor during a chemical cleaning cycle derived on a monthly basis, the chemical cleaning cycle from immediately after starting the process operation or immediately after performing chemical cleaning to the time of performing a next chemical cleaning, i.e., between a previous chemical cleaning cycle and the time at which the next chemical cleaning is performed. Therefore, the first prediction equation may be an equation representing a monthly average variation of a corresponding factor as a function of time.

The monthly average variation may be an average value of variation by date, may be an average value of variation by a predetermined date, or may be an average value using information of a selected specific date, but is not limited to any of these. For example, the monthly average variation can be calculated by screening a population by various methods generally used to calculate the average variation.

When calculating the monthly average variation in order to derive the first prediction equation, in the case of a month including the time of performing chemical cleaning, a first variation from the first day of a corresponding month to the time of performing chemical cleaning and a second variation after the time of performing chemical cleaning to the last day of the corresponding month can be calculated, and then an average value of the first variation and the second variation can be calculated as an average variation of the corresponding month.

The average used in the embodiments of the present disclosure may be an arithmetic mean, a geometric mean, or a harmonic mean.

Subsequently, when the correlation $R^2$ with a measured value of the first prediction equation derived through the above method is greater than or equal to (not less than) a predetermined value, the first prediction equation is used. When the correlation $R^2$ is less than the predetermined value, instead of using the first prediction equation, the monthly average variation used when deriving the first prediction equation may be applied individually (S206). In other words, an average variation by each month can be calculated using information of the previous year, and as a monthly average variation used to predict membrane fouling of a corresponding month of the current year, an average variation of the same month of the previous year can be used directly.

According to the above, between the prediction equation represented by Equation 9 and the prediction equation represented by Equation 10, the prediction equation with higher correlation $R^2$ between the prediction equation and a measured value is selected. Even when the prediction equation with the higher correlation $R^2$ is selected as a prediction equation, if an absolute value of the correlation $R^2$ is small, the reliability of the selected prediction equation is lowered because the error between the predicted value predicted through the selected prediction equation and the measured value is high.

Therefore, after determining the correlation $R^2$ with the measured value of the prediction equation selected as above, if a result of determination is determined as an acceptable level, the selected prediction equation is used. If a result of determination is determined as an unacceptable level, instead of using the prediction equation, prediction may be performed using another method, thus improving the reliability of prediction. This method is applied to both the first prediction equation and the second prediction equation, and another method to be used instead of the prediction equation is different for the first prediction equation and the second prediction equation.

Here, the absolute value of the correlation $R^2$ may be, for example, 0.5, 0.6, 0.7, 0.8, or 0.9, but a value other than these may be selected by a user. In addition, predetermined values of the correlation $R^2$ used to determine the reliability of the first prediction equation and the second prediction equation may be the same as or different from each other.

Next, the second prediction equation is for predicting the normalized pressure drop, normalized water permeability, and normalized salt permeability values immediately after performing chemical cleaning, which is an equation represented by the derived Equation 9 or 10, using a value of each factor immediately after performing chemical cleaning. Therefore, the second prediction equation may be an equation representing a value of a corresponding factor immediately after performing chemical cleaning as a function of time.

Here, the second prediction equation may be obtained by using all the values of a normalized factor immediately after performing chemical cleaning, and preferably may be obtained using only values of the normalized factor immediately after performing chemical cleaning on a monthly basis. For example, if chemical cleaning is performed in January of each year, a second prediction equation corresponding to January may be established using values of a normalized factor immediately after performing the January chemical cleaning.

When the correlation $R^2$ with a measured value of the second prediction equation thus derived is greater than or equal to a predetermined value, each normalized factor value immediately after performing chemical cleaning calculated using the second prediction equation is used. However, when the correlation $R^2$ is less than the predetermined value, instead of using the second prediction equation, an average value of each normalized factor immediately after performing chemical cleaning used to derive the second prediction equation is used (S206).

Here, in the case of the normalized salt permeability among the factors, when the correlation $R^2$ with a measured value of the second prediction equation for the normalized salt permeability is less than the predetermined value, an average value of the normalized salt permeability immediately after performing chemical cleaning is applied, and a weight according to the increase in operating time is applied thereto whereby a normalized salt permeability value immediately after performing chemical cleaning can be calculated.

This weight is applied because the normalized salt permeability increases as the operating time increases due to aging of the membrane even when periodic chemical cleaning is performed. This may be applied by adding a value of the factor that increases in proportion to the number of days of operation to a calculated normalized salt permeability value.

Describing the second prediction equation for each factor again, in the case of the normalized water permeability, when the correlation $R^2$ is less than the predetermined value, a normalized water permeability value immediately after performing chemical cleaning can be predicted using the above-described method. However, when collected information includes water permeability information by month and by time of chemical cleaning, prediction may be performed by applying the normalized water permeability immediately after performing monthly chemical cleaning or by applying an average value of the normalized water permeability immediately before and after a corresponding month.

First, the application of the normalized water permeability immediately after performing the monthly chemical cleaning is performed when chemical cleaning is performed in a corresponding month of the previous year. For example, when chemical cleaning is performed in January, March, May, or August of the previous year, the normalized water permeability immediately after performing chemical cleaning in the same month in the previous year can be applied in January, March, May, and August of the current year.

On the other hand, when chemical cleaning was not performed in a corresponding month of the previous year, i.e., in the case of February, April, and June and July, prediction may be performed by applying an average value of the normalized water permeability at the time of performing chemical cleaning immediately before and after the corresponding month of the previous year. In other words, an average value of January and March information may be applied in February, an average value of March and May information may be applied in April, and an average values of May and August information may be applied in June.

When the calculation is performed using the prediction equations, when the correlation $R^2$ with measured values of the prediction equations is low, the factors at the time immediately after chemical cleaning, by month and by chemical cleaning cycle, are all considered. This ensures that prediction is made in consideration of changes according to seasons, weather, and chemical cleaning, and thus the reliability of prediction is improved.

According to the method described above, a long-term membrane fouling prediction is performed in consideration of the normalized factor values at the time of chemical cleaning and the variation according to chemical cleaning cycle. This allows two determinations, a chemical cleaning time determination and a membrane module replacement time determination, to be made.

First, as the chemical cleaning time, the time at which at least one of normalized water permeability, normalized salt permeability, and/or normalized pressure drop predicted values fulfills a reference value may be determined. The reference value applied herein may be set by a user, and the reference value may be a specific value or variable.

Here, the reference value is set differently for each normalized factor as described above in the first embodiment of the present disclosure. By comparing a predicted value and a reference value for each factor, it is determined that the time at which a predicted value of at least one factor fulfills a reference value of the corresponding factor is the time of performing chemical cleaning.

As such, a specific time is determined as the time of performing chemical cleaning, and prediction is continuously performed in the same manner and thus another time of performing chemical cleaning is determined, thus predicting a chemical cleaning cycle in a long-term reverse osmosis process. Therefore, it is possible that chemical costs required for chemical cleaning are calculated in advance, thus making it easy to establish a long-term operation plan of the reverse osmosis process.

Meanwhile, as described above, the time at which the normalized salt permeability fulfills a specific reference value during long-term prediction may be determined as the membrane module replacement time. Here, the specific reference value may be set by a user, and the reference value of the normalized salt permeability for determining the membrane module replacement time may be greater than a reference value of the normalized salt permeability for determining the time of performing chemical cleaning.

As such, the reference value of the normalized salt permeability for determining the membrane module replacement time may be the rate of increase in the normalized salt permeability, and the value may be, for example, 130%, 150%, or 160%, and may be set by a user without being limited to these.

Thereafter, when the membrane module replacement time is determined, a prediction equation is applied again based on this time, and long-term membrane fouling prediction may be continuously performed. Here, the prediction equation may be a prediction equation used to determine a first membrane module replacement time, or may be newly established by applying additional information obtained thereafter.

In the long-term prediction method of membrane fouling above, described that a prediction equation is generated or prediction is made using monthly information. However, this is to consider water quality conditions of raw water and is not necessarily limited to monthly information. It will be apparent to those skilled in the art that a prediction equation can be generated or prediction is made using seasonal information, and that prediction can be performed using information over a predetermined period of time during which the water quality of raw water is relatively uniform.

A membrane fouling prediction method in a reverse osmosis process in the related art is applicable to laboratory scale, or only when the water quality of raw water is constant. However, the short-term and long-term prediction methods of membrane fouling according to the embodiments of the present disclosure are applicable to large-scale reverse osmosis plants in operation because prediction equations are established based on operation information of the reverse osmosis process, and the degree of membrane fouling is calculated to predict the time of chemical cleaning and membrane module replacement.

In addition, due to the fact that the normalized factors for the water temperature and the flow rate variation are used when generating prediction equations, it is possible that changes in performance of a membrane due to only membrane fouling is predicted, by excluding influence due to the water temperature or the flow rate variation in actual operation.

Moreover, it is possible that the time of chemical cleaning and membrane replacement is predicted more accurately, and that the operating pressure for producing the design flow rate is calculated. This therefore makes it possible that the total cost of chemicals used for chemical cleaning and the total cost of electricity used to operate the reverse osmosis process are calculated, and that the quality of produced water, i.e., the total dissolved solids concentration, is predicted.

Figure 3:
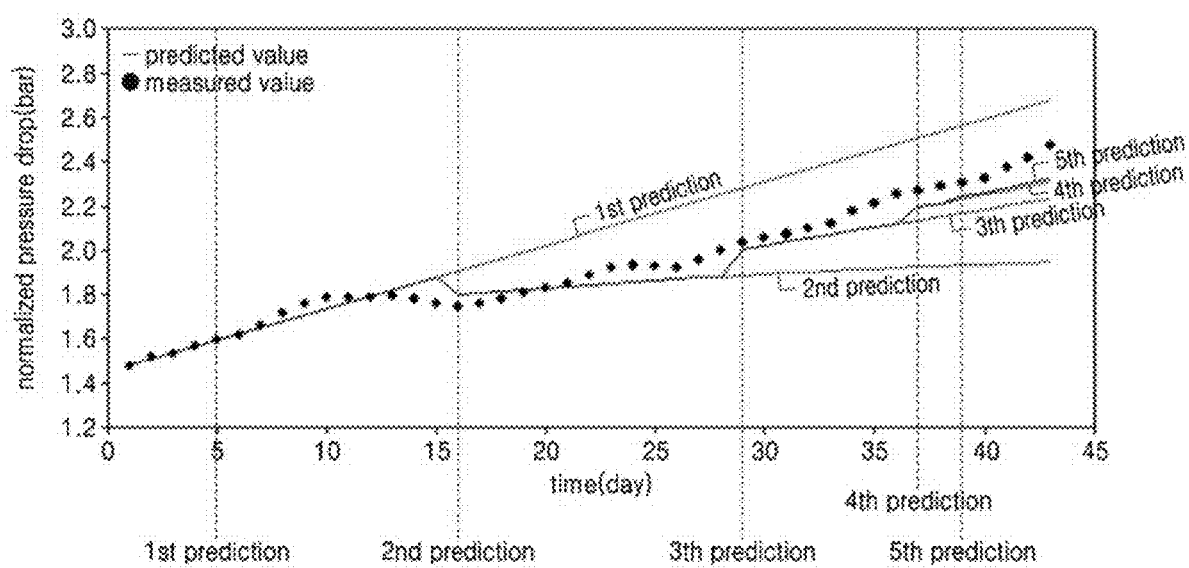
FIGS. 3 to 5 are graphs showing a normalized pressure drop, normalized water permeability, and normalized salt permeability, respectively, predicted according to the first embodiment of the present disclosure.
Figure 4:
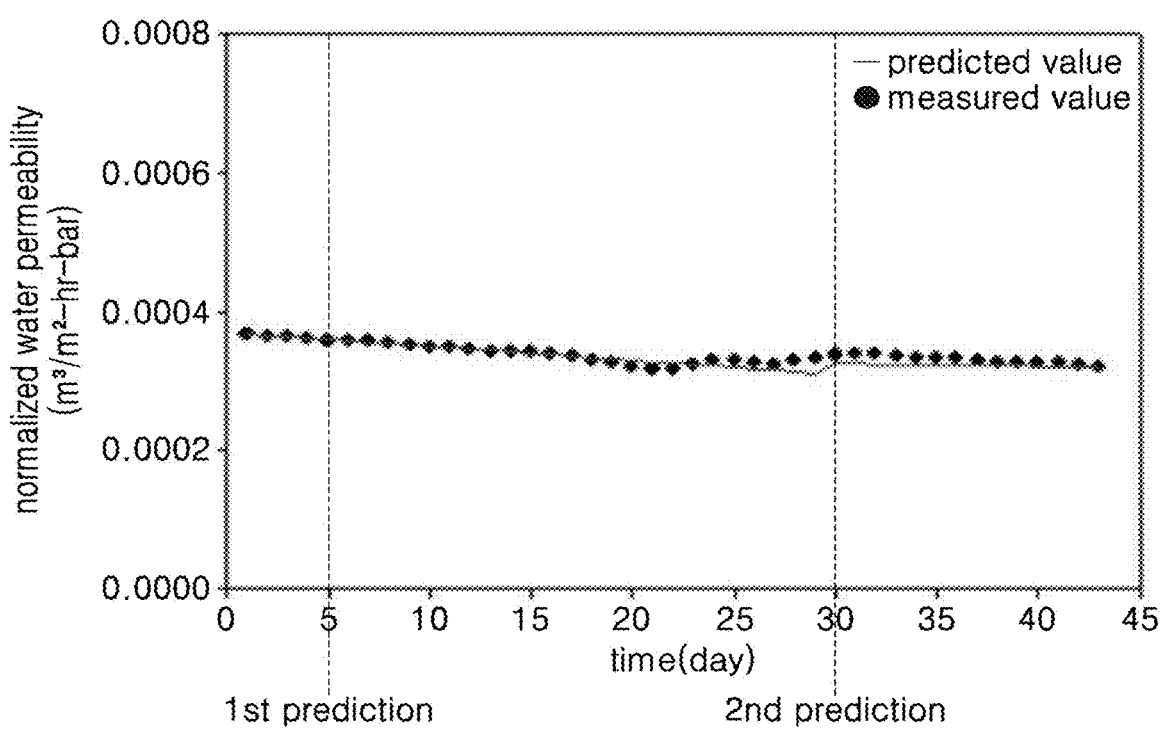
Figure 5:
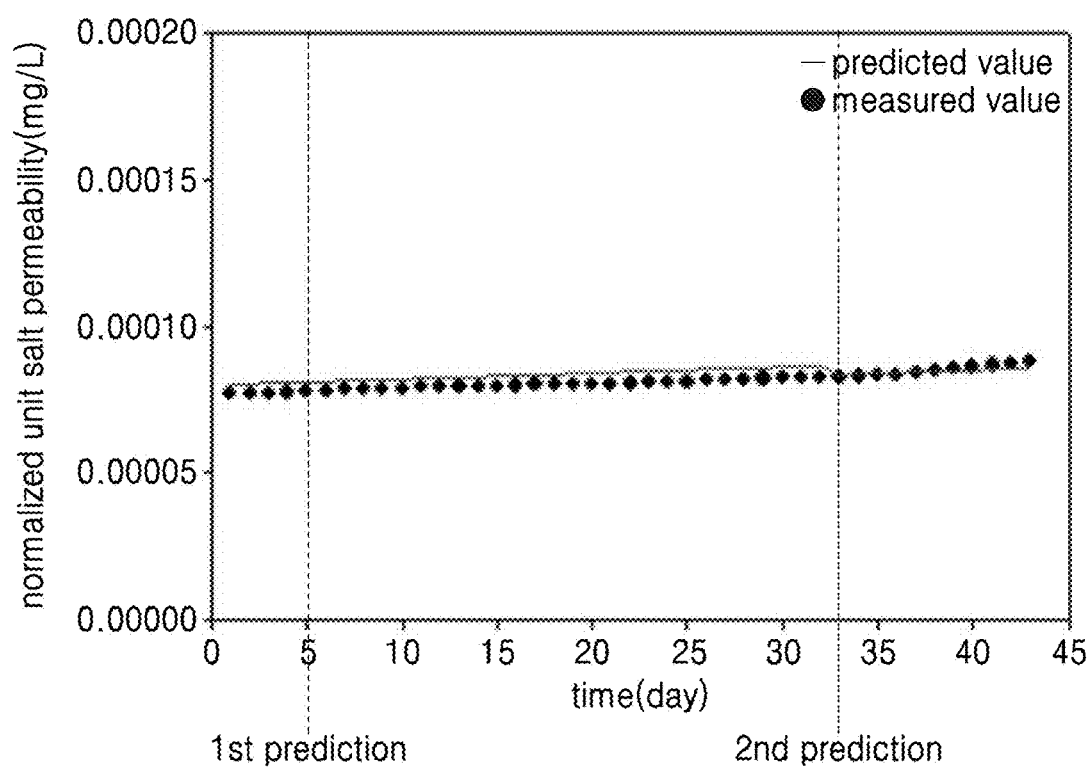

FIGS. 3 to 5 show results of applying the short-term prediction method of membrane fouling in the reverse osmosis process according to the first embodiment of the present disclosure by using a water quality factor and a process factor measured when operating the reverse osmosis process for about 45 days.

FIG. 3 shows predicted values and measured values of a normalized pressure drop. Five predictions were performed for about 45 days, and it can be found that the accuracy of a prediction value at the time when a corresponding prediction is performed is improved as the number of prediction increases.

FIG. 4 shows predicted values and measured values of a normalized unit water permeability, and FIG. 5 shows predicted values and measured values of a normalized unit salt permeability.

Referring to FIGS. 4 and 5, it can be found that the accuracy of the predicted values with respect to the measured values of each of the normalized unit water permeability and the normalized unit salt permeability is very high.

Figure 6:
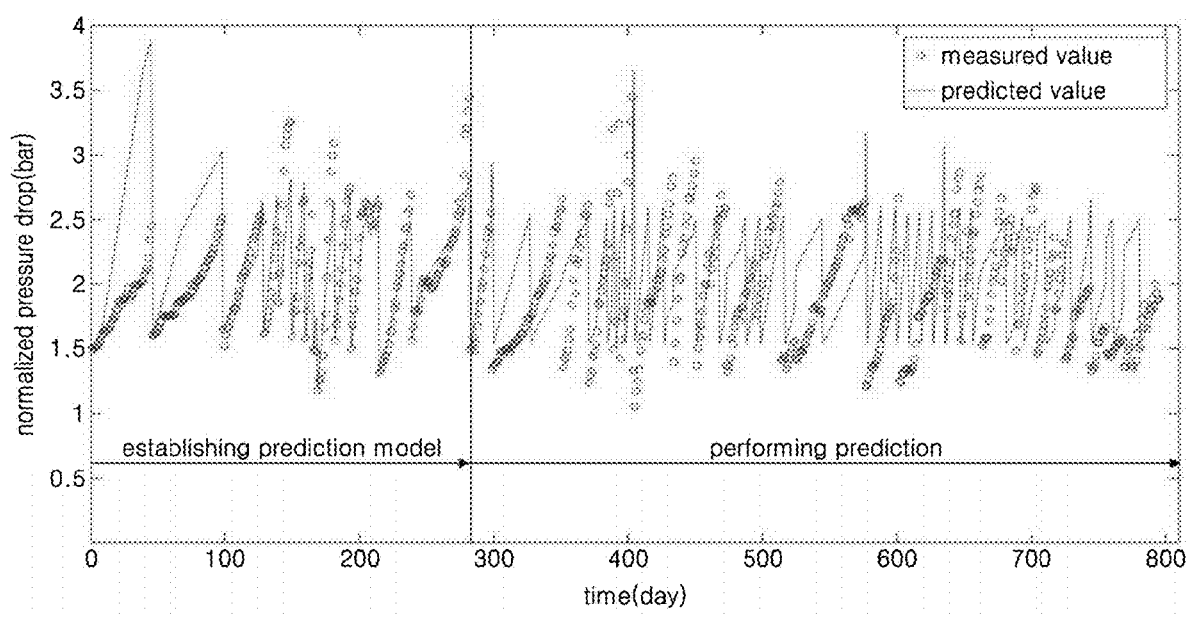
FIGS. 6 to 8 are graphs showing a normalized pressure drop, normalized water permeability, and normalized salt permeability, respectively, predicted according to the second embodiment of the present disclosure.
Figure 7:
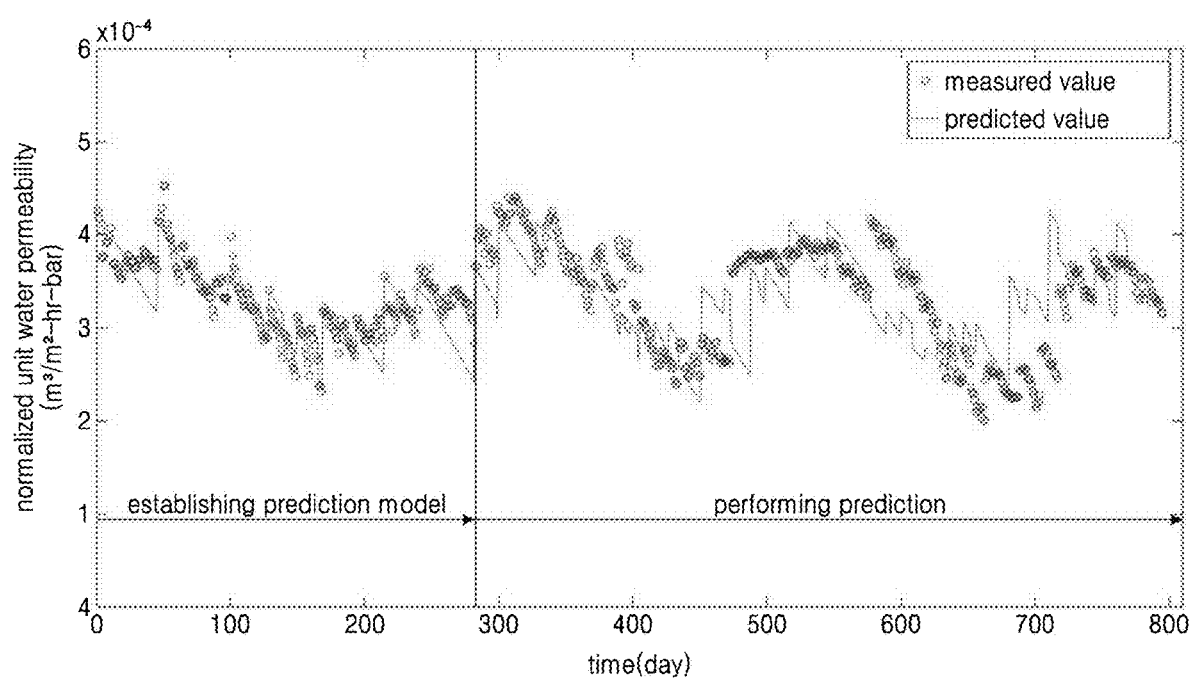
Figure 8:
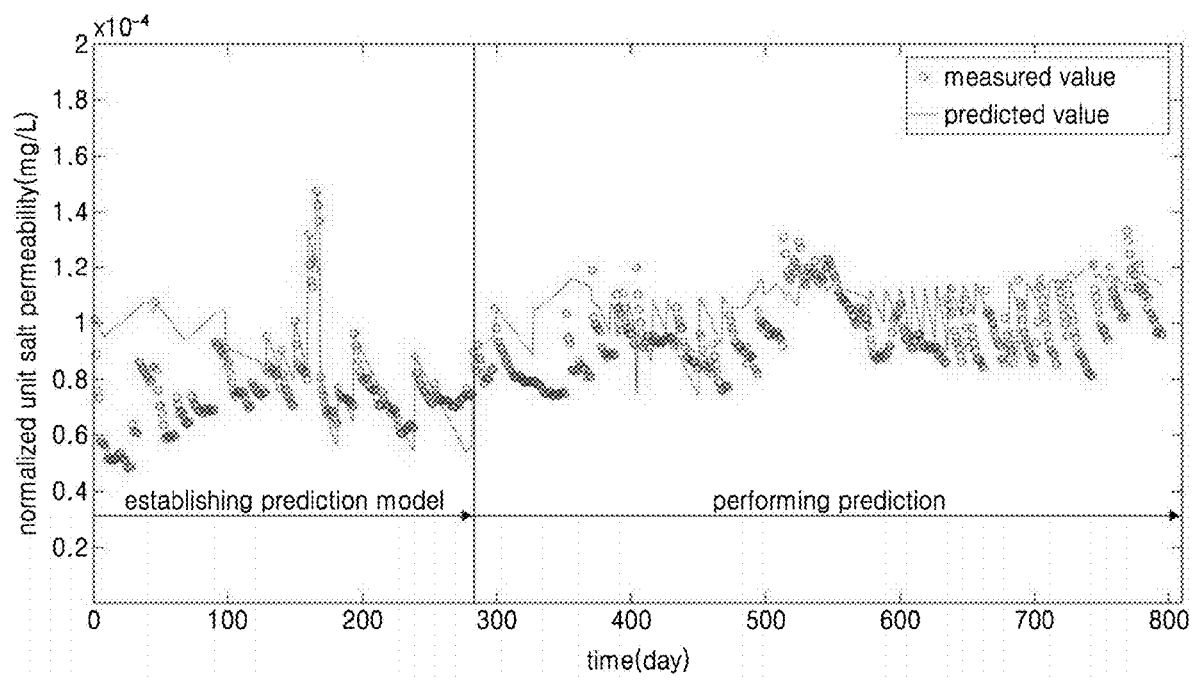

On the other hand, FIGS. 6 to 8 are views showing results of applying the long-term prediction method of membrane fouling in the reverse osmosis process according to the second embodiment of the present disclosure by using a water quality factor and a process factor measured when operating the reverse osmosis process for at least two years.

A prediction equation was generated by collecting information for about nine months. Referring to FIGS. 6 to 8, as a result of predicting membrane fouling for about a year and a half using the generated prediction equation, it can be found that the accuracy of prediction of membrane fouling is very high.

In particular, even when there is a difference between a predicted value and a measured value of a specific date, the predicted value is in an absolute value range similar to the measured value, and the trend of the predicted value and the trend of the measured value appear quite similar. Therefore, the long-term prediction method of membrane fouling in the reverse osmosis process according to the second embodiment was found to be highly accurate and very effective when applied to long-term membrane fouling prediction including chemical cleaning time.

Figure 9:
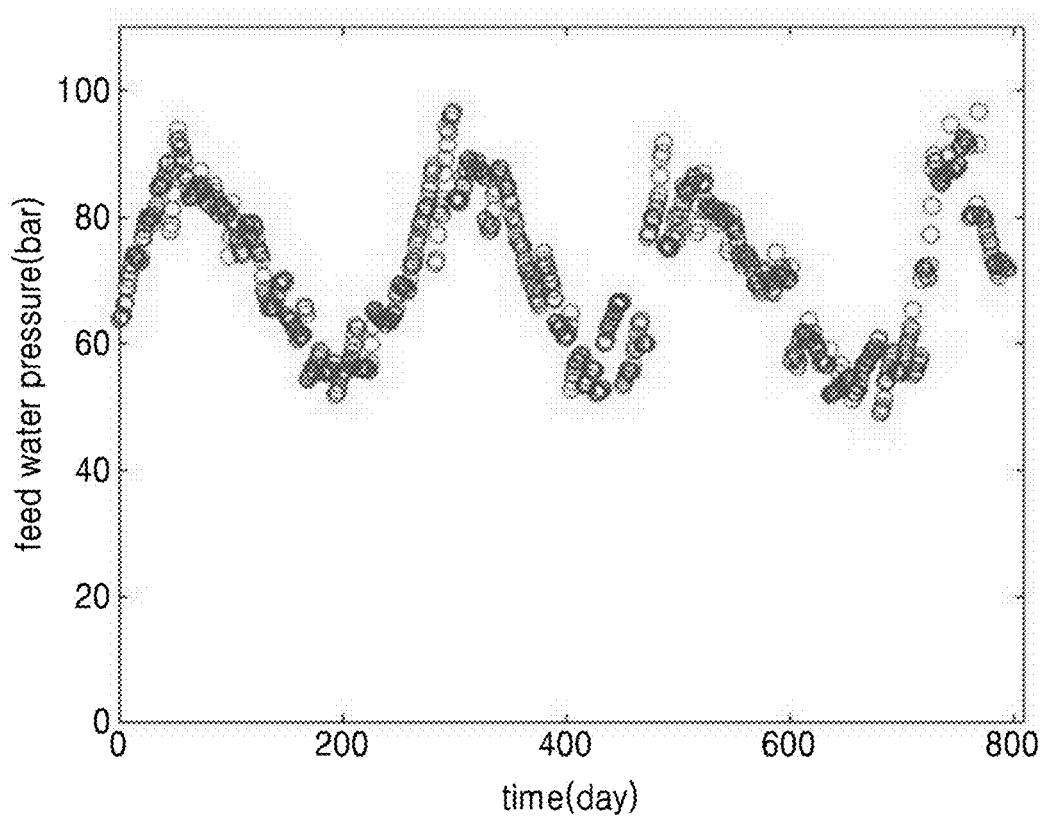
FIGS. 9 and 10 are graphs showing pressure of feed water and concentration of total dissolved solids in permeate, respectively, in the reverse osmosis process to which the second embodiment of the present disclosure is applied.
Figure 10:
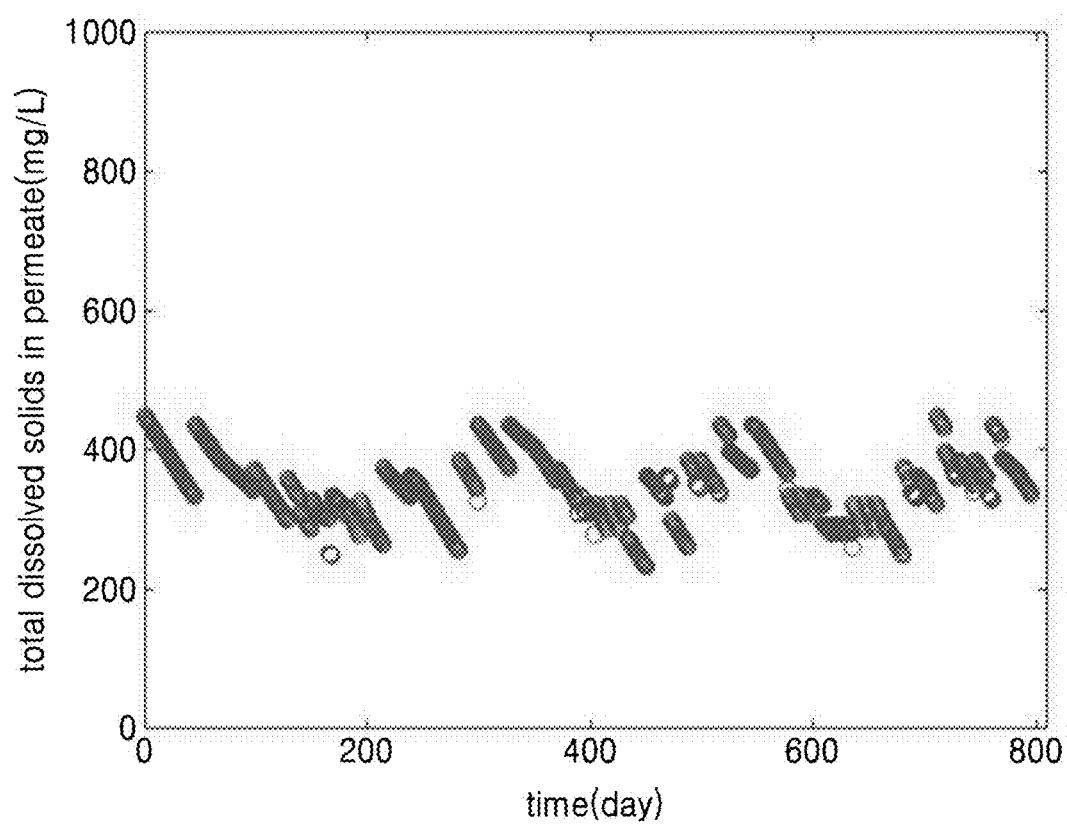

FIGS. 9 to 10 show the pressure of feed water and the concentration of total dissolved solids in produced water, respectively, calculated using a normalized water permeability and a normalized salt permeability predicted when the long-term prediction method of membrane fouling is applied.

In other words, when calculation is performed reversely using predicted values obtained according to the long-term prediction method of membrane fouling according to the present disclosure, it is possible that the change in operating pressure for producing the design flow rate is calculated and thus total power cost during a prediction period is calculated, and that the water quality of produced water that changes with chemical cleaning cycle.

While the exemplary embodiments of the disclosure have been described above, it will be understood by those skilled in the art that the disclosure can be modified in various forms without departing from the technical spirit of the disclosure. Therefore, the scope of the disclosure should be determined on the basis of the descriptions in the appended claims, not any specific embodiment, and all equivalents thereof should belong to the scope of the disclosure.

What is claimed is:
1. A method of predicting fouling in a membrane of a reverse osmosis module, the method comprising:
performing a reverse osmosis process as a water treatment process using the membrane of the reverse osmosis module, the reverse osmosis process being performed over a predetermined period of time of operation of the reverse osmosis module and including
measuring a process factor over the predetermined period of time, and
measuring a water quality factor over the predetermined period of time;
calculating a salt removal rate and a pressure drop based on the measured process factor and the measured water quality factor;
normalizing a flow rate of water produced by the reverse osmosis process, the salt removal rate, and the pressure drop;
generating a prediction equation using normalized values of the flow rate of the produced water, the salt removal rate, and the pressure drop values, the prediction equation generated as a linear expression and a power expression for each of the normalized pressure drop, a normalized water permeability calculated using the normalized flow rate of the produced water, and a normalized salt permeability calculated using the normalized salt removal rate;
predicting membrane fouling through the generated prediction equation to determine a chemical cleaning time; and
performing chemical cleaning based on the chemical cleaning time,
wherein the measuring of the process factor includes measuring the flow rate of the produced water,
wherein the measuring of the water quality factor includes measuring total dissolved solids (TDS) present in the reverse osmosis module during the reverse osmosis process and measuring a temperature of each of feed water, concentrated water, and the produced water, wherein the linear expression is Y(t)=at+b, and the power expression is Y(t)=at$^b$, where Y(t) is a predicted value of each of the normalized pressure drop, the normalized water permeability, and the normalized salt permeability, where t is an operating time, and where a and b are fitting parameters, wherein the normalized water permeability is calculated by $$A_n = \frac{Q_n}{M \times RNDP}$$

where $A_n$ is the normalized water permeability expressed in m³/(m²-hr-bar), where $Q_n$ is the normalized flow rate of the produced water expressed in m³/hr, where M is a membrane area expressed in m², and where RNDP is a reference net driving force expressed in bars, and wherein the normalized salt permeability is calculated by $$B_n = S_n \times (1 - S_n) \times \frac{Q_n}{M}$$

where $B_n$ is the normalized salt permeability expressed in m/hr, where $S_n$ is the salt removal rate, where $Q_n$ is the normalized flow rate of the produced water expressed in m³/hr, and where M is a membrane area expressed in m².

2. The method of claim 1, wherein the flow rate of the produced water, the salt removal rate, and the pressure drop are normalized for at least one of a temperature and a flow rate.

3. The method of claim 1, wherein the prediction equation generating includes selecting, among the prediction equations, the prediction equation having a higher correlation with respect to a measured value.

4. The method of claim 3, further comprising:
regenerating a prediction equation corresponding to the prediction equation generated by the prediction equation generating, when an error between an average value of the predicted values Y(t) and an average value of measured values over a predetermined period is outside a predetermined range.

5. The method of claim 3,
wherein the chemical cleaning time is determined as a time at which at least one of the predicted values of the normalized water permeability, the normalized salt permeability, and the normalized pressure drop predicted through the prediction equations fulfills a reference value, and
wherein the reference value is predetermined for each of the normalized water permeability, the normalized salt permeability, and the normalized pressure drop.

6. The method of claim 5, further comprising:
transmitting a preparation signal for performing chemical cleaning, when the at least one of the predicted values of the normalized water permeability, the normalized salt permeability, and the normalized pressure drop predicted through the prediction equations is not less than a predetermined ratio of the reference value.

7. A method of predicting fouling in a membrane of a reverse osmosis module, the method comprising:
performing a reverse osmosis process as a water treatment process using the membrane of the reverse osmosis module, the reverse osmosis process being performed over a predetermined period of time of operation of the reverse osmosis module and including
measuring a process factor over the predetermined period of time, and
measuring a water quality factor over the predetermined period of time;
calculating a salt removal rate and a pressure drop based on the measured process factor and the measured water quality factor;
normalizing a flow rate of water produced by the reverse osmosis process, the salt removal rate, and the pressure drop;
generating a prediction equation using normalized values of the flow rate of the produced water, the salt removal rate, and the pressure drop values, the prediction equation including a first equation indicating a variation of a normalized factor during a chemical cleaning cycle, and a second equation indicating a value of the normalized factor immediately after performing chemical cleaning, the normalized factor including the pressure drop, a water permeability, and a salt permeability;
predicting membrane fouling by using the prediction equation in order to determine a chemical cleaning time and a membrane replacement time, when a correlation between a predicted value predicted through the prediction equation and a measured value is not less than a predetermined value; and
replacing the membrane based on the membrane replacement time,
wherein the measuring of the process factor includes measuring the flow rate of the produced water,
wherein the measuring of the water quality factor includes measuring total dissolved solids (TDS) present in the reverse osmosis module during the reverse osmosis process and measuring a temperature of each of feed water, concentrated water, and the produced water,
wherein the first equation is generated as a first linear expression and a first power expression using a monthly average variation of each of the normalized pressure drop, the normalized water permeability, and the normalized salt permeability during the chemical cleaning cycle,
wherein the first linear expression is Y'(t)=at+b, and the first power expression is Y'(t)=at$^b$, where Y'(t) is a predicted value of a variation of each of the normalized pressure drop, the normalized water permeability, and the normalized salt permeability during the chemical cleaning cycle, where t is an operating time, and where a and b are fitting parameters,
wherein the second equation is generated as a second linear expression and a second power expression using a value of each of the normalized pressure drop, the normalized water permeability, and the normalized salt permeability immediately after performing the chemical cleaning,
wherein the second linear expression is Y"(t)=at+b, and the second power expression is Y"(t)=at$^b$, where Y"(t) is a predicted value of each of the normalized pressure drop, the normalized water permeability, and the normalized salt permeability immediately after performing chemical cleaning, where t is an operating time, and where a and b are fitting parameters, wherein the normalized water permeability is calculated by $$A_n = \frac{Q_n}{M \times RNDP}$$

where $A_n$ is the normalized water permeability expressed in m³/(m²-hr-bar), where $Q_n$ is the normalized flow rate of the produced water expressed in m³/hr, where M is a membrane area expressed in m², and where RNDP is a reference net driving force expressed in bars, and wherein the normalized salt permeability is calculated by $$B_n = S_n \times (1 - S_n) \times \frac{Q_n}{M}$$

where $B_n$ is the normalized salt permeability expressed in m/hr, where $S_n$ is the salt removal rate, where $Q_n$ is the normalized flow rate of the produced water expressed in m³/hr, and where M is a membrane area expressed in m².

8. The method of claim 7, wherein the flow rate of the produced water, the salt removal rate, and the pressure drop are normalized for at least one of a temperature and a flow rate.

9. The method of claim 7, wherein the prediction equation generating includes selecting, among the prediction equations, the prediction equation having a higher correlation with respect to a measured value.

10. The method of claim 9, wherein the membrane fouling is predicted by directly applying the monthly average variations instead of the first equation, when the correlation of the first equation is less than the predetermined value.

11. The method of claim 7, wherein the prediction equation generating includes selecting, among the prediction equations, the prediction equation having a higher correlation with respect to a measured value.

12. The method of claim 11, wherein the membrane fouling is predicted by using an average value of the normalized pressure drop immediately after performing the chemical cleaning, when the correlation of the second equation for the normalized pressure drop is less than the predetermined value immediately after performing the chemical cleaning.

13. The method of claim 11, wherein the membrane fouling is predicted by using an average value of the normalized salt permeability immediately after performing the chemical cleaning and by applying a weight according to an increase in the operating time, when the correlation of the second equation for the normalized salt permeability is less than the predetermined value immediately after performing the chemical cleaning.

14. The method of claim 11, wherein the membrane fouling is predicted by using an average value of the normalized water permeability immediately after performing the chemical cleaning, when the correlation of the second equation for the normalized salt permeability is less than the predetermined value immediately after performing the chemical cleaning.

15. The method of claim 11, wherein the membrane fouling is predicted by applying the normalized water permeability immediately after performing a monthly chemical cleaning or by applying an average value of the normalized water permeability immediately before and after a corresponding month, when the correlation of the second equation for the normalized salt permeability is less than the predetermined value immediately after performing the chemical cleaning.

16. The method of claim 7,
wherein the chemical cleaning is performed multiple times, each chemical cleaning time determined as a time at which at least one of the predicted values of the normalized water permeability, the normalized salt permeability, and the normalized pressure drop is predicted through the prediction equation fulfills a reference value, and
wherein the reference value is predetermined for each of the normalized water permeability, the normalized salt permeability, and the normalized pressure drop.

17. The method of claim 7, wherein the membrane replacement time is determined as a time at which a predicted value of the normalized salt permeability prediction value is not less than the predetermined value.

* * * * *